(12) United States Patent
Tadahal et al.

(10) Patent No.: US 12,342,238 B2
(45) Date of Patent: Jun. 24, 2025

(54) SEAMLESS ROAMING OF MULTI-RADIO STATION

(71) Applicant: AVAGO TECHNOLOGIES INTERNATIONAL SALES PTE. LIMITED, Singapore (SG)

(72) Inventors: Shivkumar Tadahal, Bengaluru (IN); Manoj Raveendranath Kamath, Bengaluru (IN); Jayaraman Nagarajan, Bengaluru (IN); Rohit Upmanyu, Bengaluru (IN); Deepak Kumar Damodaran, Bengaluru (IN); Sreenath Sharma, Bengaluru (IN); Raghvendra Gupta, Bengaluru (IN); Somaraju Dasam, Bengaluru (IN); Kumar Ramanna, Bengaluru (IN); Samson Kativarapu, Hyderabad (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 313 days.

(21) Appl. No.: 17/582,712

(22) Filed: Jan. 24, 2022

(65) Prior Publication Data
US 2023/0239762 A1 Jul. 27, 2023

(51) Int. Cl.
*H04W 4/00* (2018.01)
*H04W 8/12* (2009.01)
(Continued)

(52) U.S. Cl.
CPC ............. *H04W 36/32* (2013.01); *H04W 8/12* (2013.01); *H04W 12/06* (2013.01); *H04W 52/00* (2013.01); *H04W 52/02* (2013.01); *H04W 84/12* (2013.01)

(58) Field of Classification Search
CPC ....... H04W 36/32; H04W 8/12; H04W 12/06; H04W 84/12; H04W 36/0069; H04W 36/0027; H04W 36/18; Y02D 30/70
See application file for complete search history.

(56) References Cited

U.S. PATENT DOCUMENTS 8,885,605 B2 * 11/2014 Chin ................. H04W 36/0005
370/331
2007/0258461 A1 * 11/2007 Phadnis ................ H04W 28/20
370/395.21
(Continued)

FOREIGN PATENT DOCUMENTS

CN    104247550 B  * 3/2019  ........ H04W 36/0016
CN    111741500 A    10/2020
(Continued)

OTHER PUBLICATIONS

Chai et al. PE2E Machine Translation of CN-104247550-B (Year: 2019).*
(Continued)

*Primary Examiner* — Edan Orgad
*Assistant Examiner* — Hidayat Dabiri
(74) *Attorney, Agent, or Firm* — Foley & Lardner LLP

(57) ABSTRACT

A method for seamless WiFi roaming of a multi-radio station when transitioning from an initial access point to a target access point, wherein the method comprises activating a second communication link between the multi-radio station and the target access point while a first communication link between the multi-radio station and the initial access point is still active, and after said activating, deactivating the first communication link between the multi-radio station and the initial access point.

20 Claims, 8 Drawing Sheets

(51) Int. Cl.
  *H04W 12/06* (2021.01)
  *H04W 36/32* (2009.01)
  *H04W 52/00* (2009.01)
  H04W 52/02 (2009.01)
  H04W 84/12 (2009.01)

(56) References Cited

U.S. PATENT DOCUMENTS

| | | | | |
|---|---|---|---|---|
| 2012/0134309 | A1* | 5/2012 | Sakai | H04W 52/0206 370/311 |
| 2018/0026736 | A1* | 1/2018 | Mitani | H04W 76/10 370/337 |
| 2019/0313471 | A1* | 10/2019 | Lee | H04W 84/12 |
| 2020/0059858 | A1* | 2/2020 | Liu | H04W 68/02 |
| 2021/0144598 | A1* | 5/2021 | Liu | H04W 36/06 |
| 2021/0345207 | A1* | 11/2021 | Sun | H04W 8/02 |
| 2022/0225200 | A1* | 7/2022 | Smith | H04L 1/1614 |
| 2023/0094149 | A1* | 3/2023 | Smith | H04L 1/1893 370/331 |

FOREIGN PATENT DOCUMENTS

| | | |
|---|---|---|
| WO | WO-2021/154137 A1 | 8/2021 |
| WO | WO-2021/238823 A1 | 12/2021 |
| WO | WO-2022/008079 A1 | 1/2022 |

OTHER PUBLICATIONS

Extended European Search Report on EP 22210569.4 Dated Apr. 11, 2023.

Guogang Huang (Huawei): "Tentative Re (Association) for Non-AI? MLD", IEEE Draft; 11-20-0834-09-00BE-TENTATIVE-RE-ASSOCIATION-FOR-NON-AP-MLD 1 IEEE-SA Mentor, Piscataway, NJ USA vol. 802.11 EHT; 802.llbe, No. 9 Aug. 29, 2020 (Aug. 29, 2020), pp. 1-23, X:1?068172365, Retrieved from the Internet: URL:https://mentor.ieee.org/802.11/dcn/20/11-20-0834-09-00be-tentative-re-association-for-non-ap-mld.pptx [retrieved on Aug. 29, 2020] * Slides 5 to 14 *.

* cited by examiner

SEAMLESS ROAMING OF MULTI-RADIO STATION

FIELD OF THE DISCLOSURE

This disclosure generally relates to a method for seamless WiFi roaming of a multi-radio station when transitioning from an initial access point to a target access point. Furthermore, this disclosure relates to a multi-radio station, a WiFi network, a WiFi chip for a multi-radio station, and one or more storage media.

BACKGROUND OF THE DISCLOSURE

The Institute of Electrical and Electronics Engineers (IEEE) 802.11 standard is part of the IEEE 802 set of local area network (LAN) protocols and specifies the set of media access control (MAC) and physical layer (PHY) protocols for implementing wireless LAN (WLAN) WiFi computer communication in various frequencies. The frequency bands of interest include, but are not limited to, 2.4 GHz, 5 GHz, 6 GHz and 60 GHz frequency bands. IEEE 802.11be, or extremely high throughput (EHT), is the potential next amendment of the 802.11 IEEE standard.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
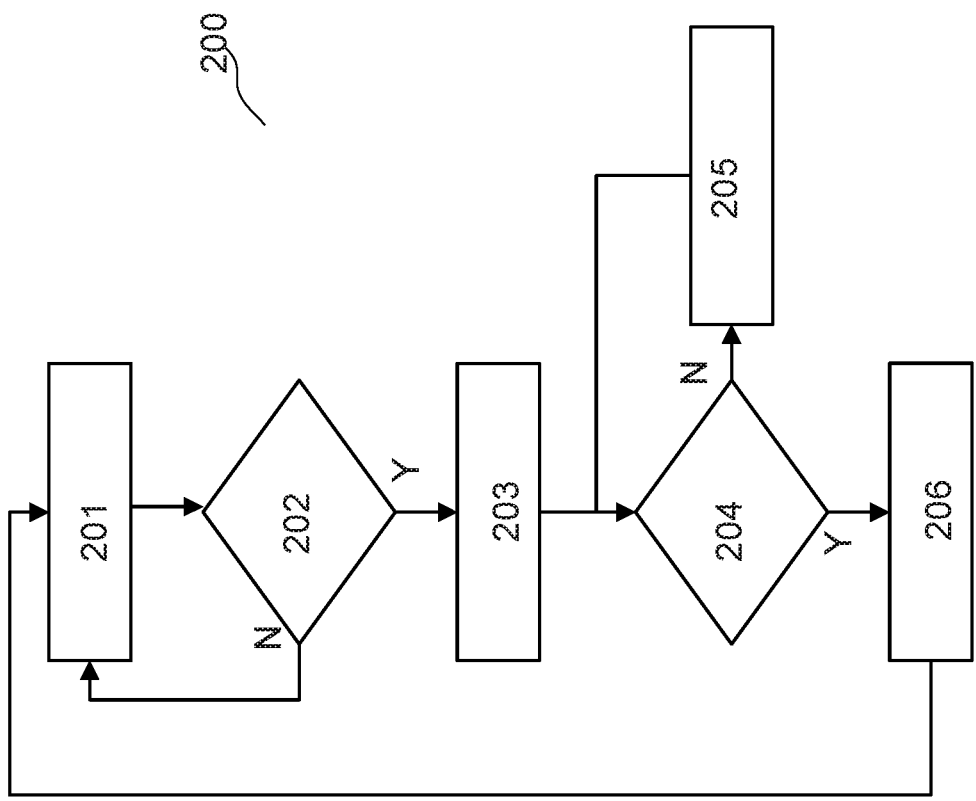
FIG. 1 illustrates a flowchart of a method for seamless WiFi roaming of a multi-radio station when transitioning from an initial access point to a target access point according to an exemplary embodiment.

The details of various embodiments of the methods and systems are set forth in the accompanying drawings and the description below.

DETAILED DESCRIPTION

Below are detailed descriptions of various concepts related to, and embodiments of, techniques, approaches, methods, apparatuses, and systems for seamless roaming of a multi-radio station operating in accordance with IEEE 802.11. The various concepts introduced above and discussed in detail below can be implemented in any of numerous ways, as the described concepts are not limited to any particular manner of implementation. Examples of specific embodiments and applications are provided primarily for illustrative purposes.

In an embodiment, a method for seamless WiFi roaming of a multi-radio station when transitioning from an initial access point to a target access point is provided, wherein the method comprises activating (or connecting) a second communication link between the multi-radio station and the target access point while a first communication link between the multi-radio station and the initial access point is still active (or is still healthy or is still connected), and after said activating, deactivating (or disconnecting) the first communication link between the multi-radio station and the initial access point.

In another embodiment, a multi-radio station configured for providing seamless WiFi roaming when transitioning from an initial access point to a target access point is provided, wherein the multi-radio station comprises a communication interface, and processing circuitry coupled to the communication interface and configured for activating a second communication link between the multi-radio station and the target access point while a first communication link between the multi-radio station and the initial access point is still active, and after said activating, deactivating the first communication link between the multi-radio station and the initial access point.

In still another embodiment, a WiFi chip for a multi-radio station is provided, the WiFi chip being configured for providing seamless WiFi roaming when the multi-radio station transitions from an initial access point to a target access point, wherein the WiFi chip is configured for activating a second communication link between the multi-radio station and the target access point while a first communication link between the multi-radio station and the initial access point is still active, and after said activating, deactivating the first communication link between the multi-radio station and the initial access point.

In still another embodiment, a WiFi network is provided which comprises an initial access point communicatively coupled with a multi-radio station, a target access point to be communicatively coupled with the multi-radio station, and the multi-radio station configured for providing seamless WiFi roaming when transitioning from the initial access point to the target access point, wherein the multi-radio station is configured for activating a second communication link between the multi-radio station and the target access point while a first communication link between the multi-radio station and the initial access point is still active, and, after said activating, deactivating the first communication link between the multi-radio station and the initial access point.

In yet another exemplary embodiment, one or more storage media is or are provided, storing computer-useable instructions that, when used by one or more processing circuitries, cause the one or more processing circuitries to perform a method for seamless WiFi roaming of a multi-radio station when transitioning from an initial access point to a target access point, the method comprising activating a second communication link between the multi-radio station and the target access point while a first communication link between the multi-radio station and the initial access point is still active, and, after said activating, deactivating the first communication link between the multi-radio station and the initial access point.

In the context of the present application, the term "WiFi" may denote in particular a wireless network protocol, in particular a wireless local area network (WLAN) protocol, which may be based on one or more of the IEEE 802.11 standards. Such a wireless network protocol may be used for local area networking of devices and internet access, allowing nearby digital devices to exchange data by radio waves.

In the context of the present application, the term "roaming" may denote in particular a process in wireless communication occurring when a mobile station is searching a new communication partner device. In particular, roaming may denote a process carried out by or involving a mobile station discovering one or more access points as potential communication partner devices, in particular when moving from a spatial range around one access point to another spatial range around another access point. During roaming, a station and an access point may be connected by an automatically executed process, for instance for forming a base service set (BSS) network. Roaming may correspond to a transition from a communication connection of a multi-radio station connected to an initial access point of an initial BSS to a communication connection of the multi-radio station connected to another target access point of another target BSS.

In the context of the present application, the term "seamless roaming" may denote in particular a process carried out by or involving a mobile station which has previously been connected with a former or initial access point for wireless communication, and intends to be connected with a subsequent or target access point for wireless communication, wherein the process of disconnecting from the initial access point and reconnecting to the target access point may be carried out without a time interval in which no wireless connection with either of said access points is established. Hence, seamless roaming may denote roaming without temporary interruption of wireless data communication for a time interval in which the mobile station is not connected to any access point.

In the context of the present application, the term "station" (which may be abbreviated as "STA") may denote in particular a device that has the capability to use an IEEE 802.11 protocol for wireless communication. For example, a station may be a mobile phone, a laptop, a desktop personal computer (PC), a vehicle (in particular a car), a traffic equipment (in particular a street light or a traffic light), or a personal digital assistant (PDA). A station may be fixed, mobile or portable. A station may function as a transmitter and/or receiver based on its transmission characteristics. For example, a station may be any device that contains an IEEE 802.11-conformant media access control (MAC) and physical layer (PHY) interface to the wireless medium.

In the context of the present application, the term "access point" (which may be abbreviated as "AP") may denote in particular a networking hardware device that allows other WiFi devices, in particular a station, to connect to a wired network. As a standalone device, an access point may have a wired connection to a router, but, in particular in a wireless router, it can also be an integral component of the router itself. For instance, an access point may be stationary. For example, an access point may provide a switching function and/or a routing function. An access point may function as a gateway to the internet and may manage one or more wireless clients (for instance a TV) in a certain network, for instance in a home network. For instance, such an access point may be implemented in a vehicle (in particular a car), a traffic equipment (in particular a street light or a traffic light), etc.

In the context of the present application, the term "initial access point" may denote in particular an access point to which a station has been previously connected and may still be connected for a transition period during roaming. Thus, an initial access point may have been communicatively coupled with a station before and during roaming. An initial access point may be decoupled or disconnected from the station after roaming.

In the context of the present application, the term "target access point" may denote in particular an access point to which a station has not yet been connected in the past but will be subsequently connected, wherein the connection may be established during roaming. Hence, the target access point may be the communication target of a station during roaming so that, after roaming, the station may be connected with the target access point for data communication.

In the context of the present application, the term "multi-radio station" may denote in particular a station with multi-radio capability to send and/or receive data at different frequencies, for instance on multi-frequency bands simultaneously and/or using time multiplexing. More particularly, a multi-radio station may be a station which is configured for communicating via radio waves with a plurality of different attributes, in particular with a plurality of different frequencies. In particular, each of plural radios of a multi-radio station may be configured for radio communication.

In the context of the present application, the term "communication link" may denote in particular a communication path or connection between a station and an access point over which messages, signals and/or other data may be transmitted between station and access point. Different communication links may be used independently from each other for communication. For example, a link may use a channel of a band. Such a band may correspond to a frequency range (for example around 2.4 GHz, around 5 GHz, or around 6 GHz), whereas a channel may relate to a sub-band of frequencies of a band.

In the context of the present application, the term "activation of a link" may denote for example a process of successful authentication and association (in particular with port authorization, if any), which may enable the involved entities to do an active data frame exchange.

In the context of the present application, the term "deactivation of a link" may denote for example deauthentication and disassociation where there shall not be any active data frame exchanges between the involved entities post the deactivation process.

Generally, embodiments may allow to carry out roaming of a WiFi station during the process of disconnecting from an initial access point and reconnection with a target access point so that there is at any time during roaming always a connection with at least one of said access points. This may prevent temporary outage of the station when moving between different access points. Such seamless roaming may be made possible when configuring the station as multi-radio station so that connection with an initial access point may be maintained until connection with a target access point is established with a safety time interval of double-connection with both access points. To put it shortly, exemplary embodiments may ensure that there is an overlap between an active communication interval between the station and the initial access point and another active communication interval between the station and the target access point during roaming. As a result, seamless roaming without loss of an active data path between the station and any of connectable access points may be accomplished.

For example, the station may be a mobile station moving between different places or positions and thereby moving between different ranges of access points (for instance located in different rooms of a building). For instance, the mobile station may be a mobile communication device such as a smartphone. When a user changes position while using the mobile station, the above-described communication architecture ensures seamless roaming of the mobile multi-radio station by guaranteeing at least one active communication channel with an access point involved in roaming at any time during roaming. This may prevent a loss of active data paths (for instance providing an internet connection) with access points in WiFi-based communication systems. Furthermore, this may reliably avoid an undesired brief outage or interruption of the communication connection of the mobile multi-radio station when moving between different access points.

More specifically, exemplary embodiments may provide a system, a method, and constituents for seamless roaming with a multi-radio entity. As part of a multi-link operation in an IEEE 802.11 protocol (for example an IEEE 802.11be protocol), all affiliated stations (STAs) in an STA MLD (Multi-link Device) may establish a connection with all affiliated access points (APs) in an AP MLD on different links. For example, an MLD STA can do power management on each of the link independently.

For example, exemplary embodiments may be used for an automotive application. For instance, an automobile may be equipped with a station configured according to an exemplary embodiment. Such an automobile-related station may be communicatively coupled with a traffic equipment, such as a street light or a traffic light. Said traffic equipment may be provided with an access point configured according to an exemplary embodiment. When the automobile passes the traffic equipment, a wireless communication between the automobile and the traffic equipment may occur, as described herein. For example, embodiments may be applied to vehicle-to-vehicle communication, more generally to vehicle-to-everything communication. For instance, the AP-STA communication for an automotive application may be made in accordance with an IEEE 802.11p standard. Thus, exemplary embodiments may be used in a wireless access in vehicular environments (WAVE) configuration.

In the following, further exemplary embodiments of the method, the multi-radio station, the WiFi network, the WiFi chip, and the one or more storage media will be explained:

For example, embodiments may be based on any IEEE 802.11 complaint device that operates on multi-band using multiple radios.

In an embodiment, the multi-radio station is a multi-link station. A multi-link station may be a station being configured for operating with a plurality of separate communication links. When the station is a multi-link station, one communication link may be used for remaining connected with an initial access point during roaming, while another communication link may be used for establishing a new connection with a target access point during roaming. Hence, a multi-link operation of a multi-link station may ensure seamless roaming by ensuring an overlap between a previous communication connection with an initial access point and a subsequent communication connection with a target access point.

In an embodiment, the method comprises and/or at least one of the multi-radio station, the WiFi network, the WiFi chip, and the one or more storage media is configured for transmitting communication messages between the multi-radio station on the one hand and at least one of the initial access point and the target access point on the other hand over the first communication link and over the second communication link. Hence, any of said communication links may be used by the multi-radio station for communicating with one or different access points. For instance, a plurality of communication links of the multi-link station may be used for communicating with one access point (in particular simultaneously). It is also possible that the first communication link may be used for communicating with a first access point, and the second communication link is used for (in particular simultaneously) communicating with another second access point.

In an embodiment, the method comprises and/or at least one of the multi-radio station, the WiFi network, the WiFi chip, and the one or more storage media is configured for transmitting communication messages over the first communication link and over the second communication link using at least one of the group comprising different frequency channels of a common communication frequency band, and different communication frequency bands. In embodiments, the different communication links may correspond to different communication frequencies of different bands and/or different channels of the same band.

In an embodiment, the method comprises and/or at least one of the multi-radio station, the WiFi network, the WiFi chip, and the one or more storage media is configured for transmitting communication messages over the first communication link and over the second communication link simultaneously or by time multiplexing. Thus, different communication links may be used at the same time, wherein different communication links may be distinguished by frequency of transmitted signals. It is however also possible to apply time multiplexing for transmitting in different time slots over the various communication links (for instance in terms of time division multiplexing, TDM).

In an embodiment, the method comprises and/or at least one of the multi-radio station, the WiFi network, the WiFi chip, and the one or more storage media is configured for transmitting communication messages between the multi-radio station on the one hand and at least one of the initial access point and the target access point on the other hand based on an IEEE 802.11 protocol. For instance, an IEEE 802.11 protocol existent at the priority or filing date of the present application may be used. It is however also possible that an IEEE 802.11 protocol being under development at or entering into force after the priority or filing date of the present application may be used in terms of exemplary embodiments (for instance IEEE 802.11be).

Figure 3:
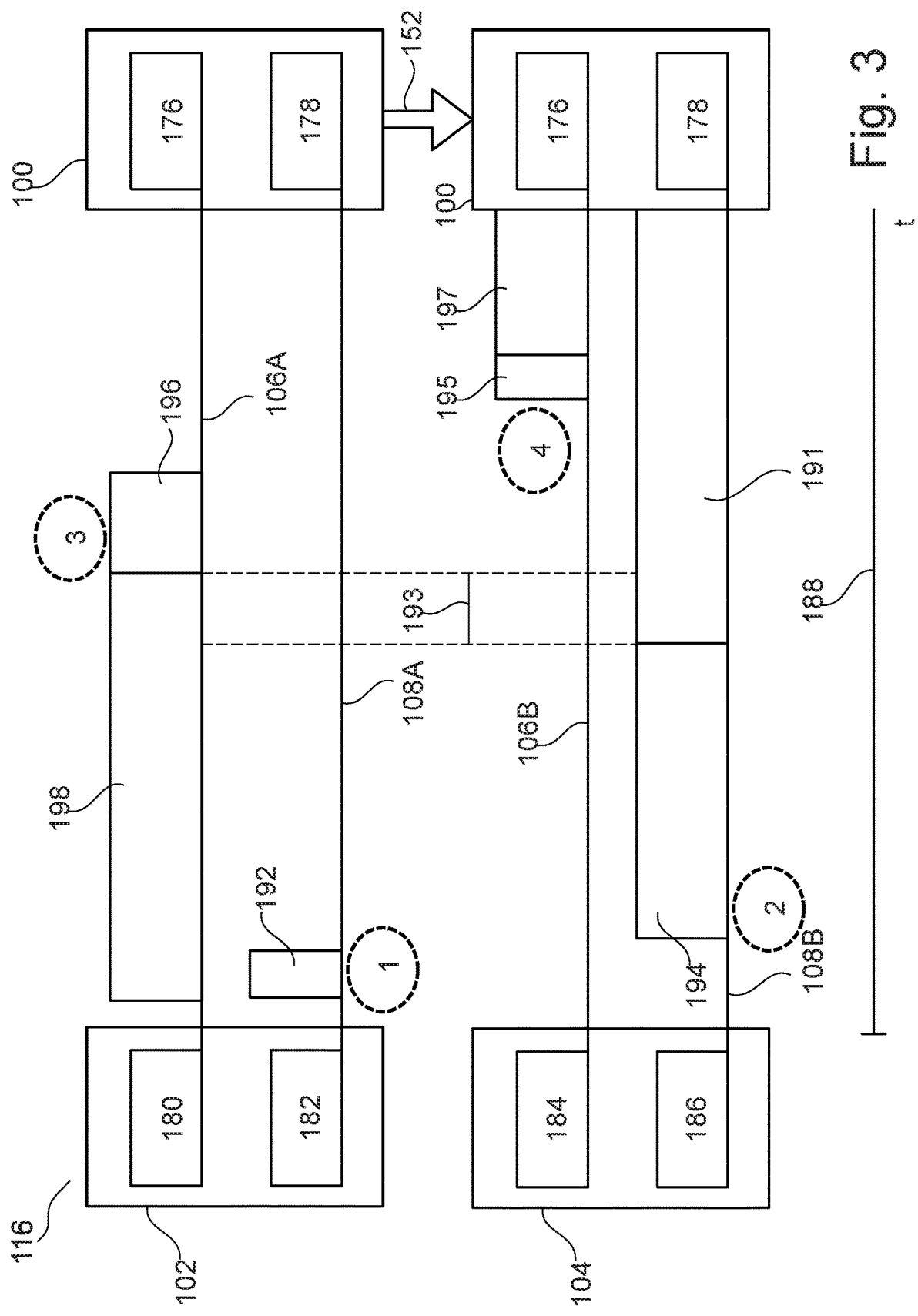
FIG. 3 illustrates a WiFi network comprising a multi-radio station, a multi-radio access point and a further multi-radio access point according to another exemplary embodiment.

In an embodiment, the initial access point is a multi-radio access point (in particular a multi-link access point) and the target access point is a multi-radio access point (in particular a multi-link access point). Such an embodiment is shown in FIG. 3. Thus, each of the access points contributing to the roaming process may be a multi-radio access point, e.g. an access point with multi-radio capability to send and/or receive on multi-frequency bands simultaneously and/or using time multiplexing. In particular, communication between multi-radio access points and a multi-radio station may be possible for supporting seamless roaming. Advantageously, communication between multi-link access points and a multi-link station may be carried out according to exemplary embodiments.

Figure 4:
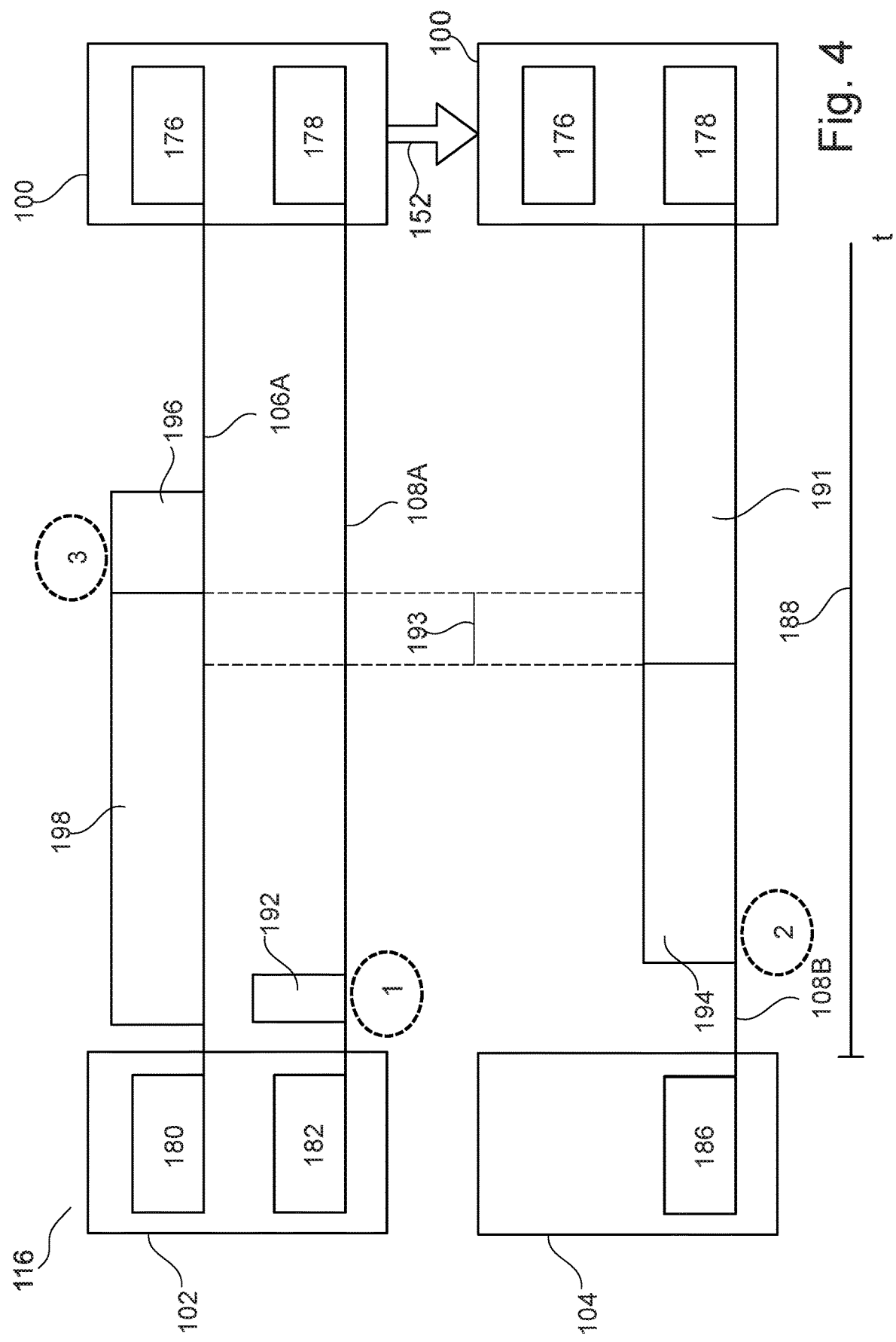
FIG. 4 illustrates a WiFi network comprising a multi-radio station, a multi-radio access point and a further single-radio access point according to another exemplary embodiment.

In an embodiment, the initial access point is a multi-radio access point (in particular a multi-link access point) and the target access point is a single-radio access point (in particular a single-link access point). Such an embodiment is shown in FIG. 4. Thus, exemplary embodiments may even be implemented when the target access point does not support multi-radio communication.

Figure 5:
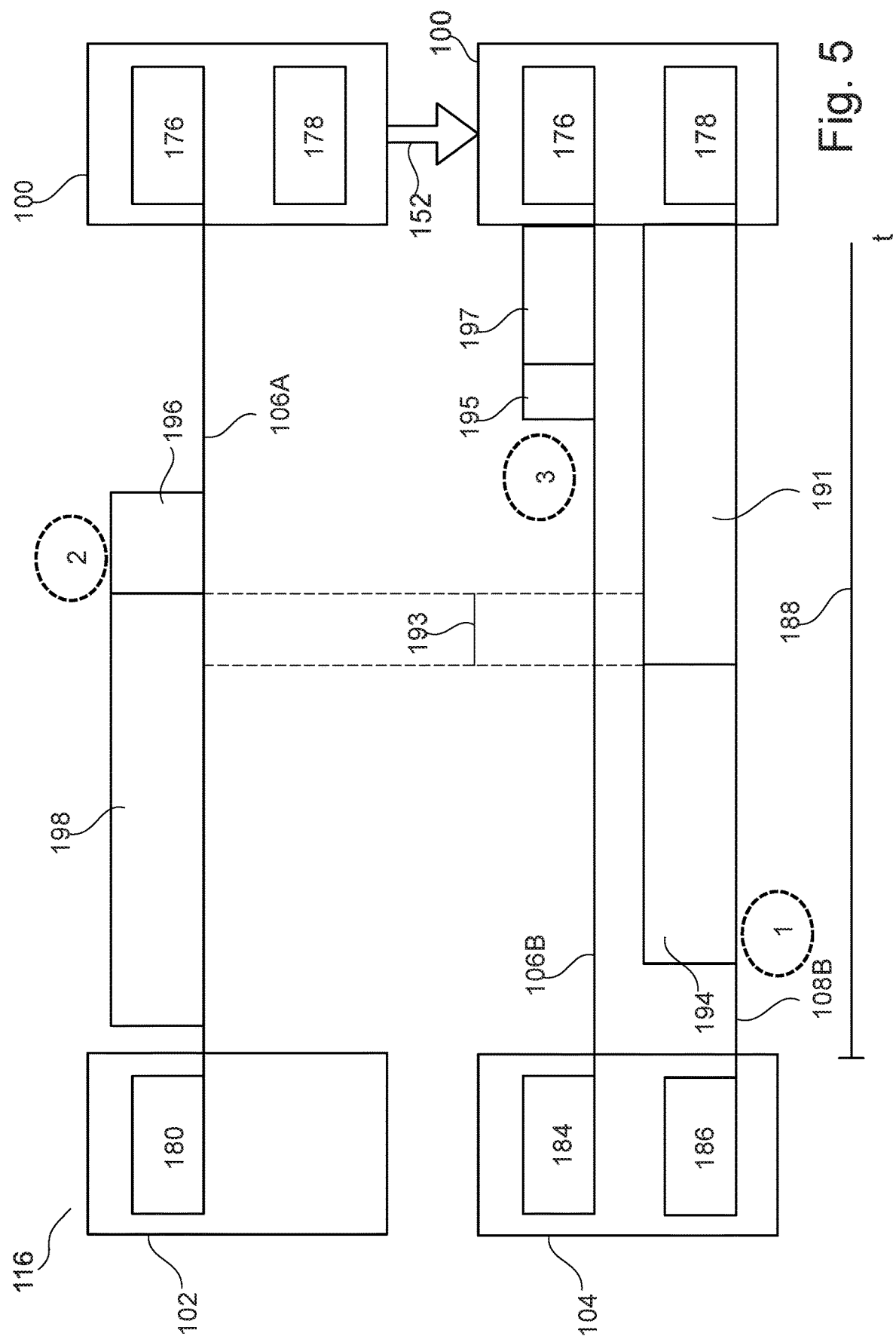
FIG. 5 illustrates a WiFi network comprising a multi-radio station, a single-radio access point and a further multi-radio access point according to another exemplary embodiment.

In an embodiment, the initial access point is a single-radio access point (in particular a single-link access point) and the target access point is a multi-radio access point (in particular a multi-link access point). A corresponding embodiment is shown in FIG. 5. Hence, an exemplary embodiments may even ensure seamless roaming when a single-radio initial access point is present.

In an embodiment, the initial access point is a single-radio access point (in particular a single-link access point) and the target access point is a single-radio access point (in particular a single-link access point). For a corresponding embodiment, reference is made to FIG. 6. Even both access points involved in a seamless roaming process may be single-radio type access points. A seamless roaming process may nevertheless be ensured by a multi-radio station.

Advantageously, exemplary embodiments only need to adapt the station to provide it with multi-radio capability and configure its control capability accordingly for supporting seamless roaming. The access points involved in such a seamless roaming process may be legacy access points without the need of a specific adaptation. The access points need not even be aware of a specific adaptation of the multi-radio station for supporting seamless roaming. This reduces the effort for implementing seamless roaming in a legacy system of access points. When adapting configuration of a station to provide it with a multi-radio capability, software and/or hardware of the station may be set correspondingly for controlling the above described seamless roaming process in other embodiments.

In an embodiment, the method comprises and/or at least one of the multi-radio station, the WiFi network, the WiFi chip, and the one or more storage media is configured for, before activating the second communication link between the multi-radio station and the target access point, switching said second communication link with the initial access point into a doze mode. In the context of the present application, the term "doze mode" may particularly denote a power saving mode in which a respective communication link is operated with low power consumption or even no power consumption. During such a doze or idle or low-power mode, the power consumption of the station (which may be a battery-power station) may be advantageously reduced. The doze mode or an active mode of a communication link may be adjusted by a corresponding communication signal communicated between station and access point(s). Such a communication signal may be a power management (PM) signal and may have a logical value "1" (PM=1) when the doze mode is activated or may have a logical value "0" (PM=0) when the doze mode is deactivated. When the second communication link between the station and the initial access point is switched into a doze mode prior to the activation of said second communication link for communication between the station and the target access point, it may be guaranteed that the communication over the second communication link for ensuring seamless roaming is not disturbed by communication over the same link with the initial access point.

In an embodiment, the method comprises and/or at least one of the multi-radio station, the WiFi network, the WiFi chip, and the one or more storage media is configured for, before activating the second communication link between the multi-radio station and the target access point, executing an authentication and association process between the multi-radio station and the target access point. When initiating communication between a station and an access point, an authentication process may be executed followed by an association process. During authentication, an authentication frame may be sent from the station to the access point followed by an acknowledgment from the access point to the station, or vice versa. During association, an association request frame may be sent from the station to the access point, followed by an association response frame sent from the access point back to the station, or vice versa. After said authentication and association process, a communication connection for data transfer between access point and station may be established.

In an embodiment, deactivating the first communication link between the multi-radio station and the initial access point comprises executing a de-authentication process between the multi-radio station and the initial access point. To put it shortly, said process of de-authentication may be the inverse of the above-described process of authentication. One of the station and the access point may send a de-authentication message to the other one, which may be confirmed by an acknowledgment.

In an embodiment, the method comprises and/or at least one of the multi-radio station, the WiFi network, the WiFi chip, and the one or more storage media is configured for, after deactivating the first communication link between the multi-radio station and the initial access point, activating the first communication link between the multi-radio station and the target access point. Thereafter, communication between the multi-radio or multi-link station and the target access point may be carried out over two (or more) communication links (in particular simultaneously).

In an embodiment, the method comprises transmitting communication messages over the first communication link, over the second communication link, and over at least one further communication link between the multi-radio station on the one hand and at least one of the initial access point and the target access point on the other hand. Hence, exemplary embodiments may use two, three or even more than three communication links for communicating between a multi-radio or multi-link station and an access point. This may allow for a highly efficient communication with a high throughput of data.

In an embodiment, the method comprises transmitting communication messages over the first communication link and over the second communication link for at least one of the group comprising an internet application, a voice over internet protocol (VOIP) application, a peer to peer (p2p) application, and a gaming application. Thus, exemplary embodiments may enable seamless roaming on handheld devices, like smartphones, for video streaming or gaming applications. However, said applications are only exemplary, and many other applications are possible according to exemplary embodiments.

According to exemplary embodiments, systems and methods for seamless roaming with a multi-radio entity in form of a WiFi station are provided.

WiFi on present-day smartphones has become ubiquitous to internet or cellular (VOIP) access and other varied variety of applications like p2p, gaming, etc. Smartphones being handheld and mobile, are bound to roam from one connected base service set (BSS) to another in quite a lot of scenarios. In some WiFi solutions not utilizing implementations of the seamless roaming systems and methods discussed herein, while roaming, a WiFi station moving the association from one BSS to another BSS may experience loss in data communication with its native BSS. The loss of data communication may be for a duration for which the station is away from its association BSS AP. Even with Fast BSS Transition (FBT), there is still a finite duration for which communication with an associated AP may be lost.

In order to overcome said and/or other shortcomings, exemplary embodiments may enable seamless roaming between APs without losing data connection (in particular with the internet). This may be useful in particular in mobile scenarios. In such embodiments, WiFi chips may be implemented which may provide support for a multi-link operation (MLO). Using MLO, exemplary embodiments may overcome the connection loss experience of legacy devices during roaming. Advantageously, exemplary embodiments may use multi-link operation for association on a single link. Preferably, transmission of power management (PM) signals may be allowed on each of the communication links, in particular separately or independently from each other.

In an advantageous embodiment, seamless inter-BSS roaming with a multi-radio capable station may be carried out. When an MLD (multi-link device) non-AP STA (e.g. a WiFi station being no access point and providing multi-link capability) roams from one MLD AP (e.g. access point with multi-link capability) or non-MLD AP (e.g. access point without multi-link capability) to another non-MLD AP (e.g. access point without multi-link capability) or to another MLD AP (e.g. access point with multi-link capability), it can do this without losing data connection as follows:
1. Maintain at least one active link with the associated AP (e.g. an initial access point), while power management (PM) can be carried out on one or more other links (for example, a power saving mode according to PM=1 can be executed on said one or more other links)
2. Using the STA's link(s) which is or are in power saving mode (PM=1) to initiate an association (multi-link (ML) or non-multi-link (non-ML)) with a new AP (e.g. a target access point)
3. Move the connection to the new AP once the association is successful.

Various embodiments are possible for enabling seamless roaming of a multi-radio station: In one embodiment, a method for seamless InterBSS roaming from an MLD AP to another MLD AP may be provided using a multi-radio capable station. In a further embodiment, a method for seamless InterBSS roaming from an MLD AP to another non-MLD AP using a multi-radio capable station may be provided. In a further embodiment, a method for seamless InterBSS roaming from a non-MLD AP to another MLD AP using a multi-radio capable station is made possible. In still another embodiment, a method for seamless InterBSS roaming from a non-MLD AP to another non-MLD AP is provided using a multi-radio capable device.

FIG. 1 illustrates a flowchart 200 of a method for seamless WiFi roaming of a multi-radio station 100 when transitioning from an initial access point 102 to a target access point 104 according to an exemplary embodiment. Concerning the reference signs used for the description of FIG. 1, reference is made in particular to FIG. 2 to FIG. 6.

Referring to reference sign 201, a multi-radio station 100 may communicate via a first communication link 106 (e.g. using link-associated hardware) with an initial access point 102. The multi-radio station 100 may, in many embodiments, maintain a second link and/or link-associated hardware (e.g. transmitters, oscillators, amplifiers, processors, etc.) in a power-saving mode (e.g. a doze mode).

Referring to reference sign 202, the multi-radio station 100, the initial access point 102, and/or a target access point 104 may determine that the multi-radio station 100 should transition from the initial access point 102 to the target access point 104. In some implementations, this determination may be based on a comparison of relative received signal strengths of the initial and target access points by the multi-radio station, or comparison of signal strengths to a threshold. In other implementations, this determination may be based on time-of-flight or delay measurements. In still other implementations, this determination may be based on location information (e.g. from triangulation from known source locations, via GPS, etc.). Combinations of these and/or other transition triggers may be utilized in various embodiments. Steps 201-202 may be repeated periodically, based on signal strength measurements, or any other such iteration trigger.

Referring to reference sign 203, upon determining to transition, the multi-radio station 100 may activate a second communication link 108 between the multi-radio station 100 and the target access point 104 while a first communication link 106 between the multi-radio station 100 and the initial access point 102 is still active. Activating the link may include transitioning the link and/or link-associated hardware from a low or reduced power mode (e.g. doze mode) to a high or full power mode. Activating the link may include transmitting an activation signal, a power management signal indicating that the link will be transitioned to high power, or any other such process, including synchronization and/or handshaking processes, resource unit reservation processes, link configuration processes, etc.

Referring to reference sign 204, the multi-radio station 100 and/or the target access point 104 may determine whether the second communication link 108 has been established or activated (e.g. synchronization, handshaking, or other configuration processes have been completed) and the link may be used for further communications. If not, at reference sign 205, the multi-radio station 100 may wait, continue performing configuration processes, and/or attempt to re-activate the second communication link 108, in various embodiments.

Once the second communication link 108 is established, referring to reference sign 206, the method comprises deactivating the first communication link 106 between the multi-radio station 100 and the initial access point 102. Deactivating the link may include transmitting a power management indicator or command on the first communication link (e.g. indicating a low power or doze mode), disconnecting or terminating the link (e.g. transmitting a close or disconnect command to the initial access point), deactivating or reducing power to link-associated hardware, or other such actions.

Figure 2:
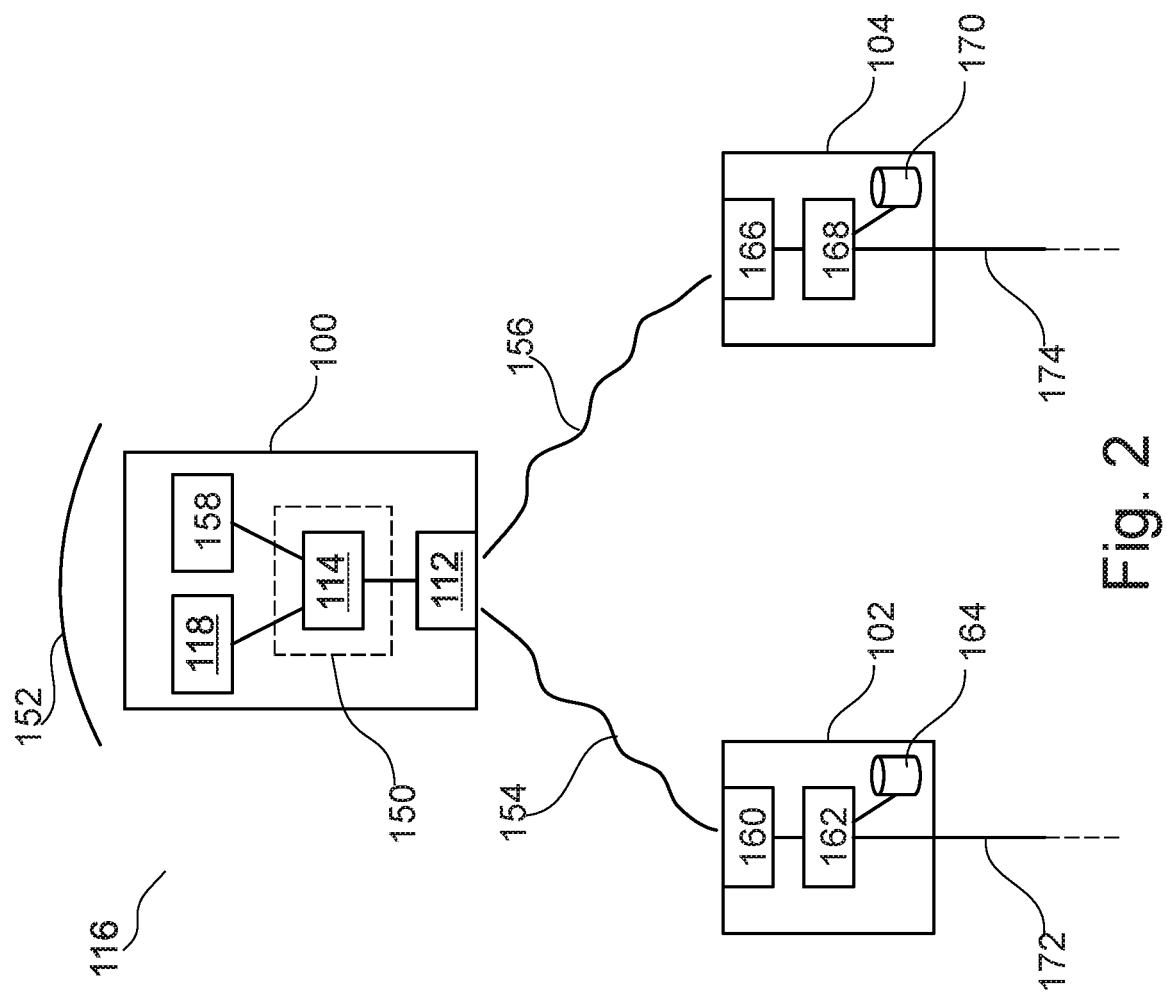
FIG. 2 illustrates a WiFi network comprising access points being or to be communicatively coupled with a multi-radio station according to an exemplary embodiment.

FIG. 2 illustrates a WiFi network 116 comprising access points 102, 104 to be communicatively coupled with a multi-radio station 100 according to an exemplary embodiment.

The WiFi network 116 according to FIG. 2 comprises initial access point 102 being presently communicatively coupled and hence associated with the multi-radio station 100. Wireless communication between the initial access point 102 and the multi-radio station 100 is indicated in FIG. 2 with reference sign 154. Multi-radio station 100 may be configured for communicating in different radio channels, in particular operating at different frequencies. More specifically, multi-radio station 100 may be configured as a mobile multi-link station which may communicate over a first communication link 106 and over a second communication link 108 (not shown in FIG. 2, see for example FIG. 3 to FIG. 6). For example, multi-radio station 100 may be embodied as a portable device such as a mobile phone. As indicated schematically by reference sign 152, a user (not shown) operating the multi-radio station 100 may move during said use. For instance, the user carrying the multi-radio station 100 may move from one room of a building to another room of the building while using the multi-radio station 100 for executing an internet application. More specifically, the user may move from a first room in the building in which initial access point 102 is located into a second room of the building in which a target access point 104 is located.

Hence, also the target access point 104 may form part of the WiFi network 116 and may be configured to be communicatively coupled with the multi-radio station 100. Wireless communication between the target access point 104 and the multi-radio station 100 is indicated with reference sign 156 in FIG. 2. When the user carrying the multi-radio station 100 moves into the second room, automatic disconnection of multi-radio station 100 from initial access point 102 and connection of multi-radio station 100 with target access point 104 may be executed during a roaming process.

Advantageously, the multi-radio station 100 is configured for providing seamless WiFi roaming when transitioning from the first room with the initial access point 102 to the second room with the target access point 104. For this purpose, the multi-radio station 100 may be equipped with a monolithically integrated WiFi chip 150 (for instance manufactured in silicon technology) configured for controlling a process of activating the above-mentioned second communication link 108 between the multi-radio station 100 and the target access point 104 while the above-mentioned first communication link 106 between the multi-radio station 100 and the initial access point 102 is still active. After said activating, the process executed or controlled by WiFi chip 150 may comprise deactivating the first communication link 106 between the multi-radio station 100 and the initial access point 102. In a nutshell, the described process ensures that at any time during roaming there is at least one active connection of the multi-radio station 100 with at least one of the access points 102, 104. Hence, the multi-radio station 100 is continuously connected with, at each point of time during roaming, at least one of the initial access point 102 and the target access point 104. In particular, a temporary overlap between the active connection of the multi-radio station 100 and the initial access point 102 over the first communication link 106 on the one hand and the active connection of the multi-radio station 100 and the target access point 104 over the second communication link 108 on the other hand may be guaranteed. Thus, the multi-radio station 100 with its WiFi chip 150 may enable seamless WiFi roaming when transitioning from initial access point 102 to target access point 104 and avoids a short outage or interruption of data communication (for instance over the internet) during roaming.

Although the seamless roaming functionality has been described as being implemented in WiFi chip 150, other exemplary embodiments may provide said seamless roaming functionality in a plurality of cooperating chips. It is also possible that at least part of the seamless roaming functionality is realized at least partially by hard-wired circuitry and/or at least partially by software.

As shown in FIG. 2, the multi-radio station 100 may comprise a communication interface 112, such as at least one antenna (for instance a transmission antenna and/or a reception antenna, or a transmission and reception antenna) for wireless communication with the access points 102, 104. Moreover, the multi-radio station 100 may comprise processing circuitry 114 coupled to the communication interface 112 and configured for controlling execution of the above described process. For example, the processing circuitry 114 may form part of the WiFi chip 150. Processing circuitry 114 may for example comprise one or more processors or cores. Apart from this, multi-radio station 100 may comprise an input/output unit 158 (for instance a touchscreen) enabling a user to input data and/or instructions and/or enabling to display information to the user. One or more storage media 118 (for example at least one hard disk and/or at least one memory chip) may be provided in the multi-radio station 100 for storing computer-useable instructions that, when used by the processing circuitry 114, cause the processing circuitry 114 to perform the above described process of seamless roaming.

As shown as well in FIG. 2, initial access point 102 may comprise a communication interface 160, for instance comprising at least one antenna (for instance a transmission antenna and/or a reception antenna, or a transmission and reception antenna) for wireless communication with multi-radio station 100. Furthermore, initial access point 102 may comprise processing circuitry 162 for executing processing tasks, and one or more storage media 164 for storing data. Correspondingly, target access point 104 may comprise a communication interface 166 (for instance comprising at least one antenna) for wireless communication with multi-radio station 100, processing circuitry 168 for executing processing tasks, and one or more storage media 170 for storing data. As indicated with reference signs 172, 174, each of access points 102, 104 may be communicatively coupled with other devices in a wireless or wired manner, see for example FIG. 9.

FIG. 3 illustrates a WiFi network 116 comprising a multi-radio station 100, a multi-radio initial access point 102 and a further multi-radio target access point 104 according to another exemplary embodiment. A temporal sequence of the communication messages transmitted between the multi-radio station 100, the multi-radio initial access point 102 and the further multi-radio target access point 104 are plotted along a time (t) axis 188 (the physical end points 100, 102, and 104 of the communication messages are shown for clarity, but should not be considered to exist or not exist at various times, and the time axis should be considered to apply to the temporal sequence of messages).

According to FIG. 3, the multi-radio station 100 is a multi-link station (which may also be denoted as multi-link device station MLD STA) configured for communicating over first communication link 106A, 106B (e.g. respectively with an initial access point and target access point) and over second communication link 108A, 108B (e.g. respectively with an initial access point and target access point). For communicating over first communication link 106A, 106B (which may be denoted as LINK0), multi-radio station 100 comprises a first station unit 176 (sometimes referred to as an "STA", which may comprise hardware and/or software for providing communications, including transmitters, receivers, amplifiers, filters, antennae, signal processors, analog-to-digital and/or digital-to-analog converters or other such circuitry). For communication over second communication link 108A, 108B (which may be denoted as LINK1), multi-radio station 100 comprises a second station unit 178 (which may similarly comprise hardware and/or software for providing communications, including transmitters, receivers, amplifiers, filters, antennae, signal processors, analog-to-digital and/or digital-to-analog converters or other such circuitry).

Again referring to FIG. 3, initial access point 102 may be configured as multi-radio access point configured for communicating over the first communication link 106A by a first initial access point unit 180 and over the second communication link 108A by a second initial access point unit 182. Access point units 108, 182 may comprise hardware and/or software for providing communications, including transmitters, receivers, amplifiers, filters, antennae, signal processors, analog-to-digital and/or digital-to-analog converters or other such circuitry. The mentioned initial access point 102 may also be denoted as multi-link device access point (MLD AP).

Correspondingly, target access point 104 of FIG. 3 may be configured as multi-radio access point configured for communicating over the first communication link 106B by a first target access point unit 184 and over the second communication link 108B by second target access point unit 186. The mentioned target access point 104 may also be denoted as multi-link device access point (MLD AP). As noted above, to distinguish between a link with the initial access point and a link with the target access point, these links are labeled respectively 106A and 108A, and 106B and 108B. Link 106A and 106B may utilize the same hardware at the multi-radio station 100 (e.g. station unit 176), may utilize the same channel or bandwidth, etc. Similarly, link 108A and 108B may utilize the same hardware at the multi-radio station 100 (e.g. station unit 178), may utilize the same channel or bandwidth, etc.

Due to the multi-link configuration of FIG. 3, communication messages between the multi-radio station 100 on the one hand and the initial access point 102 or the target access point 104 on the other hand may be transmitted simultaneously (or by time multiplexing) over the first communication link 106A and over the second communication link 108A (or 106B and 108B). Communication messages may be transmitted over the first communication link 106A and over the second communication link 108A (or 106B and 108B) for example using different communication frequencies or different communication frequency bands. The transmission of WiFi communication messages between the multi-radio station 100 on the one hand and the initial access point 102 or the target access point 104 on the other hand may happen in accordance with an IEEE 802.11 protocol.

In the following, the process of seamless roaming of multi-radio station 100 during disconnecting from previously connected initial access point 102 and connecting to target access point 104 according to the exemplary embodiment of FIG. 3 will be explained. Said roaming may be initiated when a user carrying and using portable multi-radio station 100 moves from a first location with initial access point 102 to another second location with target access point 104, see reference sign 152.

In a process labelled (1) in dashed line in FIG. 3, the multi-radio station 100 being still communicatively connected with initial access point 102 over the first communication link 106A switches the second communication link 108A with initial access point 102 into a doze or lower power mode. For this purpose, multi-radio station 100 sends a power management signal 192 over second communication link 108A to the initial access point 102 to bring the second communication link 108A into an energy-saving mode (PM=1). The initially active communication connection between multi-radio station 100 and initial access point 102 indicated by reference sign 198 in FIG. 3 remains active while the power management signal 192 is transmitted. After transmission of the power management signal 192, the second communication link 108A is placed into an energy-saving mode (e.g. reducing transmission power and/or disabling transmission hardware or amplifiers, etc.).

In a subsequent process labelled (2) in FIG. 3, the multi-radio station 100 being still communicatively connected with initial access point 102 over the first communication link 106A and having not yet activated the second communication link 108B between the multi-radio station 100 and the target access point 104, may execute an authentication and association process between the multi-radio station 100 and the target access point 104 for initiating or triggering connection between target access point 104 and multi-radio station 100 over second communication link 108B. A corresponding communication message is indicated with reference sign 194 in FIG. 3. During authentication, an authentication frame may be sent from the multi-radio station 100 to the target access point 104 followed by an acknowledgment sent back from the target access point 104 to the multi-radio station 100. During subsequent association, an association request frame may be sent from the multi-radio station 100 to the target access point 104, followed by an association response frame sent from the target access point 104 back to the multi-radio station 100. By said authentication and association process, subsequent communication between multi-radio station 100 and target access point 104 may be prepared. Upon completing the authentication and association process over the second communication link 108, the second communication link 108B is activated between the multi-radio station 100 and the target access point 104, see reference sign 191.

However, at the beginning of the activation of the second communication link 108B between the multi-radio station 100 and the target access point 104 according to reference sign 191, the first communication link 106A between the multi-radio station 100 and the initial access point 102 is still active and has not yet been deactivated (or in other words, is still healthy and has not yet been disconnected), as shown at reference sign 198. Consequently, a deactivation overlap time interval 193 occurs during which the first communication link 106A is active between the initial access point 102 and the multi-radio station 100 and simultaneously the second communication link 108B is active between the target access point 104 and the multi-radio station 100. The existence of said overlap time interval 193 (which may be on the order of a few milliseconds, a few seconds, or any other such time) ensures a seamless roaming of multi-radio station 100 transitioning from a communication coupling with initial access point 102 and a communication coupling with target access point 104. For example, in some implementations, overlap time interval 193 may be several seconds, and data may be sent on the first communication link 106A and the second communication link 108B simultaneously. Since the multi-radio station 100 is always continuously connected with at least one of the initial access point 102 and the target access point 104 during roaming, a temporary outage or loss of data communication with multi-radio station 100 may be reliably prevented. Consequently, a user operating multi-radio station 100 during roaming may continuously experience uninterrupted data communication, for instance data-transfer from the public internet.

In a subsequent process labelled (3) in FIG. 3, the multi-radio station 100 may deactivate the previously still existent first communication link 106A between the multi-radio station 100 and the initial access point 102. As shown by reference sign 196, said deactivation may comprise execution of a de-authentication process between the multi-radio station 100 and the initial access point 102. Said de-authentication process may be the inverse of the previously executed authentication process. One of the multi-radio station 100 and the target access point 104 may send a de-authentication message to the other one, which may be confirmed by an acknowledgment.

In a subsequent process labelled (4) in FIG. 3, the multi-radio station 100 may trigger, after deactivating the first communication link 106A between the multi-radio station 100 and the initial access point 102, activation of the first communication link 106B between the multi-radio station 100 and the target access point 104. For this purpose, multi-radio station 100 sends a power management signal 195 over first communication link 106B to bring the first communication link 106 in an active mode without energy-saving operation (PM=0). As can be taken from reference signs 192, 195, transmission of power management signals over the first communication link 106A, 106B and over the second communication link 108A, 108B may be carried out independently from each other. After the power management signal 195, the first communication link 106B is ready to communicate between multi-radio station 100 and target access point 104. Thus, following power management signal 195, communication between the multi-radio station 100 and the target access point 104 over the first communication link 106B is active, see reference sign 197. Hence, roaming is completed, and multi-radio station 100 can communicate with target access point 104 over both the first communication link 106B and the second communication link 108B. The previous communication between initial access point 102 and multi-radio station 100 over any of the communication links 106A, 108A is now terminated.

Concluding, FIG. 3 illustrates a process of roaming from an MLD AP, e.g. initial access point 102, to another MLD AP, e.g. target access point 104. Summarizing, the processes involved in lossless roam from initial access point 102 to another target access point 104 are the following:

Process (1): The non-AP MLD STA, e.g. multi-radio station 100 not being an access point, initiates power management signal PM=1 on the second communication link 108A (Link-1) with initial access point 102;

Process (2): The multi-radio station 100 initiates association using radio (and related hardware) of second communication link 108B to a new MLD AP, e.g. target access point 104;

Process (3): On completing association with target access point 104 on second communication link 108B, a de-authentication is initiated on the first communication link 106A (Link-0) with the previous or initial access point 102;

Process (4): A power management signal disabling a power saving mode (PM=0) is sent on first communication link 106A to enable multi-link operation with target access point 104.

The communication architecture according to FIG. 3 is applicable and extensible in other embodiments for the following cases as well:

Any number, N, of links in multi-link operations, is possible e.g. N=2 (as in FIG. 3), 3, 4, 5, . . .

Roaming can be controlled from an MLD AP to another MLD AP (as in FIG. 3)

Roaming can also be controlled correspondingly from an MLD AP to another non-MLD AP (as in FIG. 4)

Roaming can also be controlled correspondingly from a non-MLD AP to another MLD AP (as in FIG. 5)

Figure 6:
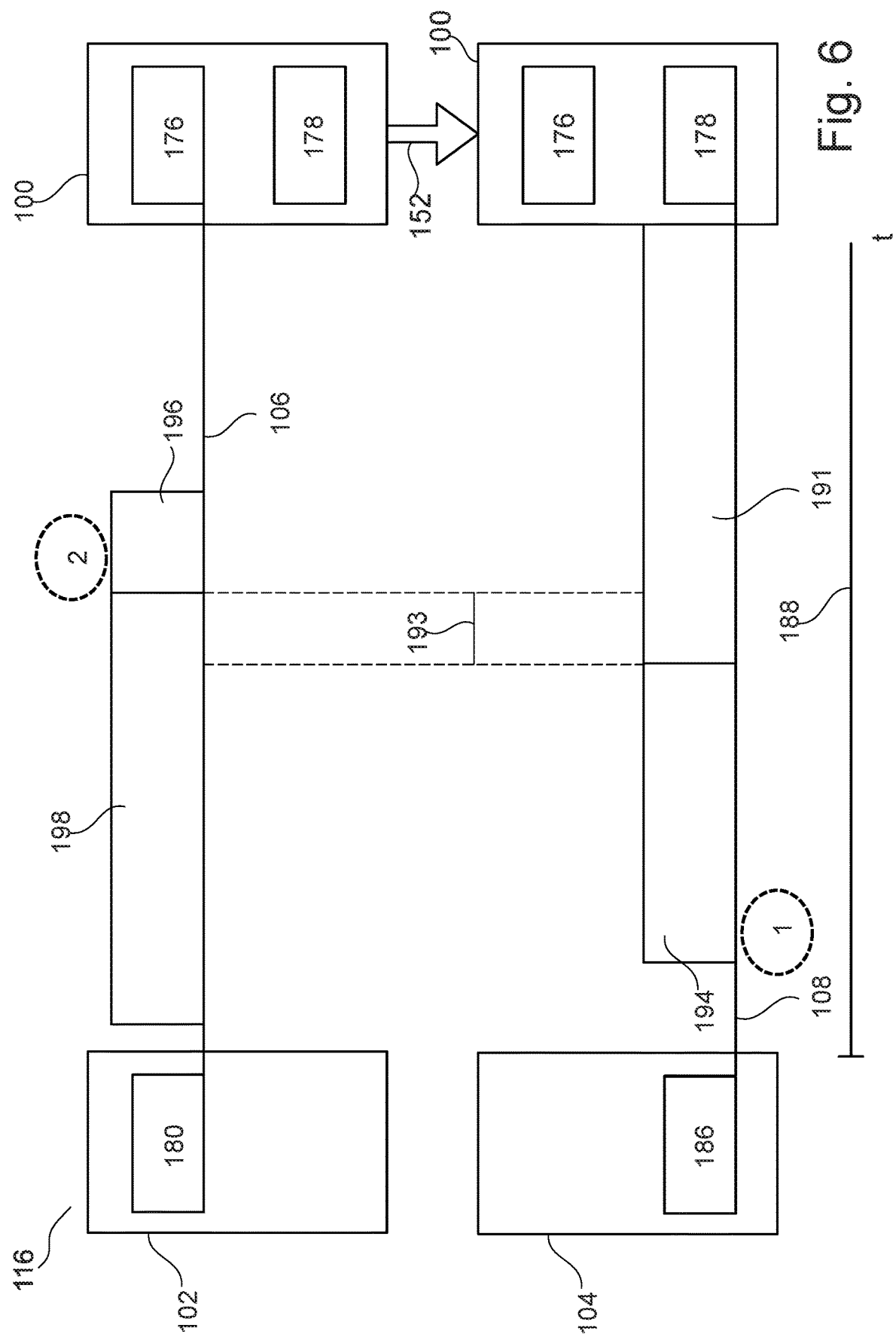
FIG. 6 illustrates a WiFi network comprising a multi-radio station, a single-radio access point and a further single-radio access point according to another exemplary embodiment.

Roaming can also be controlled correspondingly from a non-MLD AP to another non-MLD AP (as in FIG. 6)

FIG. 4 illustrates a WiFi network 116 comprising a multi-radio station 100, a multi-radio initial access point 102 and a further single-radio target access point 104 according to another exemplary embodiment.

According to FIG. 4, the initial access point 102 is a multi-radio access point and the target access point 104 is a single-radio access point. Hence, the described embodiment shows roaming from an MLD AP in form of initial access point 102 to another non-MLD AP in form of target access point 104 as illustrated in FIG. 4. To put it short, the embodiment of FIG. 4 carries out processes responding to processes (1), (2) and (3) of the embodiment of FIG. 3.

In a process labelled (1) in dashed line in FIG. 4, the multi-radio station 100 being still communicatively connected with initial access point 102 over the first communication link 106A switches the second communication link 108A into a doze mode. For this purpose, multi-radio station 100 sends a power management signal 192 over second communication link 108A to bring the second communication link 108A in an energy-saving mode (PM=1). The initially active communication connection between multi-radio station 100 and initial access point 102 is indicated by reference sign 198 in FIG. 4 and remains active. After the power management signal 192, the second communication link 108A is placed in an energy-saving mode.

In a subsequent process labelled (2) in FIG. 4, the multi-radio station 100 being still communicatively connected with initial access point 102 over the first communication link 106A and having not yet activated the second communication link 108B between the multi-radio station 100 and the target access point 104, may execute an authentication and association process between the multi-radio station 100 and the target access point 104. A corresponding communication message is indicated with reference sign 194 in FIG. 4. During authentication, an authentication frame may be sent from the multi-radio station 100 to the target access point 104 followed by an acknowledgment sent from the target access point 104 to the multi-radio station 100. During association, an association request frame may be sent from the multi-radio station 100 to the target access point 104, followed by an association response frame sent from the target access point 104 back to the multi-radio station 100. By said authentication and association process, subsequent communication between multi-radio station 100 and target access point 104 may be prepared. Directly after the authentication and association process over the second communication link 108B, the second communication link 108B is activated between the multi-radio station 100 and the target access point 104, see reference sign 191. However, when starting activation of the second communication link 108B between the multi-radio station 100 and the target access point 104, the first communication link 106A between the multi-radio station 100 and the initial access point 102 is still active and has not yet been deactivated (or in other words, is still healthy and has not yet been disconnected). Consequently, there is a deactivation overlap time interval 193 during which the first communication link 106A is active between the initial access point 102 and the multi-radio station 100 and simultaneously the second communication link 108B is active between the target access point 104 and the multi-radio station 100. The existence of said overlap time interval 193 ensures a seamless roaming of multi-radio station 100 transitioning from a communication coupling with initial access point 102 and a communication coupling with target access point 104. Since the multi-radio station 100 remains always connected with at least one of the initial access point 102 and the target access point 104 during roaming, a temporary loss of data communication with multi-radio station 100 may be reliably prevented. For instance a user operating multi-radio station 100 during roaming may continuously enjoy uninterrupted data communication, for instance data-transfer from the public internet.

In a subsequent process labelled (3) in FIG. 4, the multi-radio station 100 may deactivate the previously still existent active first communication link 106A between the multi-radio station 100 and the initial access point 102. As shown by reference sign 196, said deactivation may comprise execution of a de-authentication process between the multi-radio station 100 and the initial access point 102. Said de-authentication process may be the inverse of the previously executed authentication process. One of the multi-radio station 100 and the target access point 104 may send a de-authentication message to the other one, which may be confirmed by an acknowledgment.

FIG. 5 illustrates a WiFi network 116 comprising a multi-radio station 100, a single-radio initial access point 102 and a further multi-radio target access point 104 according to another exemplary embodiment.

According to FIG. 5, the initial access point 102 is a single-radio access point and the target access point 104 is a multi-radio access point. Thus, roaming from initial access point 102 embodied as non-MLD AP to target access point 104 embodied as another MLD AP is as illustrated in FIG. 5. To put it short, the embodiment of FIG. 5 carries out processes corresponding to the processes (2), (3) and (4) of the embodiment of FIG. 3.

In a process labelled (1) in FIG. 5, the multi-radio station 100 being still communicatively connected with initial access point 102 over the first communication link 106A and having not yet activated the second communication link 108B between the multi-radio station 100 and the target access point 104, may execute an authentication and association process between the multi-radio station 100 and the target access point 104. A corresponding communication message is indicated with reference sign 194 in FIG. 5. During authentication, an authentication frame may be sent from the multi-radio station 100 to the target access point 104 followed by an acknowledgment sent from the target access point 104 to the multi-radio station 100. During association, an association request frame may be sent from the multi-radio station 100 to the target access point 104, followed by an association response frame sent from the target access point 104 back to the multi-radio station 100. By said authentication and association process, subsequent communication between multi-radio station 100 and target access point 104 may be prepared. Directly after the authentication and association process over the second communication link 108B, the second communication link 108B is activated between the multi-radio station 100 and the target access point 104, see reference sign 191. However, when starting activation of the second communication link 108B between the multi-radio station 100 and the target access point 104, the first communication link 106A between the multi-radio station 100 and the initial access point 102 is still active and has not yet been deactivated (or in other words, is still healthy and has not yet been disconnected). Consequently, there is a deactivation overlap time interval 193 during which the first communication link 106A is active between the initial access point 102 and the multi-radio station 100 and simultaneously the second communication link 108B is active between the target access point 104 and the multi-radio station 100. The existence of said overlap time interval 193 ensures a seamless roaming of multi-radio station 100 transitioning from a communication coupling with initial access point 102 and a communication coupling with target access point 104. Since the multi-radio station 100 remains always connected with at least one of the initial access point 102 and the target access point 104 during roaming, a temporary loss of data communication with multi-radio station 100 may be reliably prevented. For instance a user operating multi-radio station 100 during roaming may continuously use uninterrupted data communication, for instance data-transfer from the public internet.

In a subsequent process labelled (2) in FIG. 5, the multi-radio station 100 may deactivate the previously still existent first communication link 106A between the multi-radio station 100 and the initial access point 102. As shown by reference sign 196, said deactivation may comprise execution of a de-authentication process between the multi-radio station 100 and the initial access point 102. Said de-authentication process may be the inverse of the previously executed authentication process. One of the multi-radio station 100 and the target access point 104 may send a de-authentication message to the other one, which may be confirmed by an acknowledgment.

In a subsequent process labelled (3) in FIG. 5, the multi-radio station 100 may trigger, after deactivating the first communication link 106A between the multi-radio station 100 and the initial access point 102, activating the first communication link 106B between the multi-radio station 100 and the target access point 104. For this purpose, multi-radio station 100 sends a power management signal 195 over first communication link 106B to bring the first communication link 106B in an active mode without saving power (PM=0). After the power management signal 195, the first communication link 106B is ready to communicate between multi-radio station 100 and target access point 104. Following power management signal 195, communication between the multi-radio station 100 and the target access point 104 over the first communication link 106B is active, see reference sign 197. Thus, roaming is completed, and multi-radio station 100 can communicate with target access point 104 over both the first communication link 106B and the second communication link 108B. The previous communication between initial access point 102 and multi-radio station 100 over the communication link 106A is now terminated.

FIG. 6 illustrates a WiFi network 116 comprising a multi-radio station 100, a single-radio initial access point 102 and a further single-radio target access point 104 according to another exemplary embodiment.

According to FIG. 6, the initial access point 102 is a single-radio access point and the target access point 104 is a single-radio access point. Hence, FIG. 6 illustrates roaming from a non-MLD AP in form of initial access point 102 to another non-MLD AP in form of target access point 104 as illustrated in FIG. 6. To put it short, the embodiment of FIG. 6 carries out processes corresponding to the processes (2) and (3) of the embodiment of FIG. 3.

In a process labelled (1) in FIG. 6, the multi-radio station 100 being still communicatively connected with initial access point 102 over the first communication link 106 and having not yet activated the second communication link 108 between the multi-radio station 100 and the target access point 104, may execute an authentication and association process between the multi-radio station 100 and the target access point 104. A corresponding communication message is indicated with reference sign 194 in FIG. 3. During authentication, an authentication frame may be sent from the multi-radio station 100 to the target access point 104 followed by an acknowledgment sent from the target access point 104 to the multi-radio station 100. During association, an association request frame may be sent from the multi-radio station 100 to the target access point 104, followed by an association response frame sent from the target access point 104 back to the multi-radio station 100. By said authentication and association process, subsequent communication between multi-radio station 100 and target access point 104 may be prepared. Directly after the authentication and association process over the second communication link 108, the second communication link 108 is activated between the multi-radio station 100 and the target access point 104, see reference sign 191. However, when starting activating the second communication link 108 between the multi-radio station 100 and the target access point 104, the first communication link 106 between the multi-radio station 100 and the initial access point 102 is still active and has not yet been deactivated (or in other words, is still healthy and has not yet been disconnected). Consequently, there is a deactivation overlap time interval 193 during which the first communication link 106 is active between the initial access point 102 and the multi-radio station 100 and simultaneously the second communication link 108 is active between the target access point 104 and the multi-radio station 100. The existence of said overlap time interval 193 ensures a seamless roaming of multi-radio station 100 transitioning from a communication coupling with initial access point 102 and a communication coupling with target access point 104. Since the multi-radio station 100 remains always connected with at least one of the initial access point 102 and the target access point 104 during roaming, a temporary loss of data communication with multi-radio station 100 may be reliably prevented. For instance a user operating multi-radio station 100 during roaming may continuously use uninterrupted data communication, for instance data-transfer from the public internet.

In a subsequent process labelled (2) in FIG. 6, the multi-radio station 100 may deactivate the previously still existent first communication link 106 between the multi-radio station 100 and the initial access point 102. As shown by reference sign 196, said deactivation may comprise execution of a de-authentication process between the multi-radio station 100 and the initial access point 102. Said de-authentication process may be the inverse of the previously executed authentication process. One of the multi-radio station 100 and the target access point 104 may send a de-authentication message to the other one, which may be confirmed by an acknowledgment.

Figure 7:
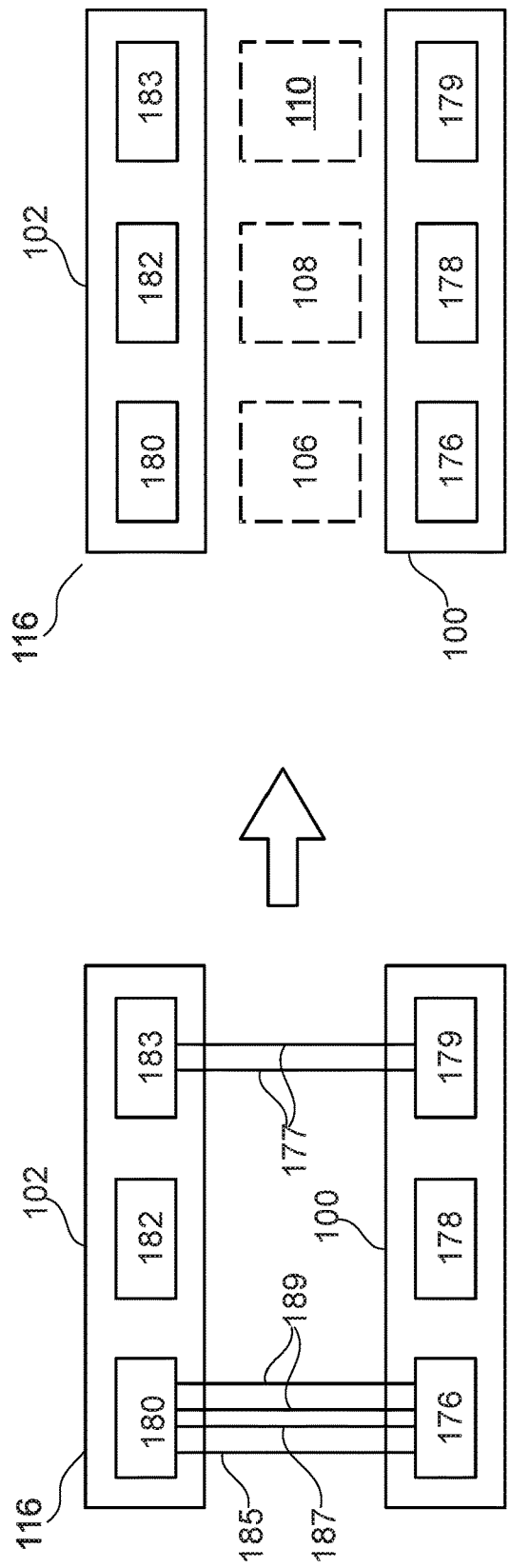
FIG. 7 illustrates a WiFi network comprising a multi-radio station, and a multi-radio access point being coupled for communicating over three communication links according to an exemplary embodiment.

FIG. 7 illustrates a WiFi network 116 comprising a multi-radio station 100, and a multi-radio access point 102 being coupled for communicating over three communication links 106, 108, 110 according to an exemplary embodiment. The multi-radio station 100 may be configured for seamless roaming involving multi-radio access point 102, as described for previously mentioned embodiments.

FIG. 7 shows the example of a multi-radio access point 102, which can be denoted as AP MLD, and multi-radio station 100, which can be denoted as non-AP MLD. In the shown embodiment, multi-radio station 100 comprises a first station unit 176, a second station unit 178, and a third station unit 179. Correspondingly, multi-radio access point 102 of FIG. 7 comprises first initial access point unit 180, second initial access point unit 182, and third initial access point unit 183. For example, first initial access point unit 180 is configured for communication over a first frequency band such as 2.4 GHz. For instance, second initial access point unit 182 may be configured for communication over a second frequency band such as 5 GHz. For example, third initial access point unit 183 is configured for communication over a third frequency band such as 6 GHz. For initiating communication coupling between multi-radio station 100 and multi-radio access point 102, an authentication and association process may be carried out. In this context, a communication message and a corresponding acknowledgment, both denoted with reference sign 189, can be exchanged between multi-radio station 100 and multi-radio access point 102 for authentication. Furthermore, an association request frame 185 and an association response frame 187 may be exchanged for association. Thereafter, exchange of communication messages is possible, see reference sign 177. After authentication and association, multi-radio station 100 and multi-radio access point 102 may communicate over three communication links, for example first communication link 106 which may correspond to a first frequency band (for instance 2.4 GHz), second communication link 108 which may correspond to a second frequency band (for instance 5 GHz), and third communication link 110 which may correspond to a third frequency band (for instance 6 GHz). Thus, the above-described seamless roaming process may also be executed in a scenario in which three or more communication links are established between a multi-radio station 100 and access points 102, 104 involved in the roaming process.

FIG. 7 illustrates multi-link association between multi-radio station 100 and multi-radio access point 102. As part of an ML operation in an IEEE 802.11 standard, all the affiliated STAs in an STA MLD (Multi-link Device) may establish a connection with all affiliated APs in an AP MLD on different links. FIG. 7 illustrates an ML association and link establishment.

On the completion of association on a respective link (for example 2.4 GHz in FIG. 7) a non-AP MLD STA can explicitly send a power management signal PM=0 on each of the associated links (5 GHz and 6 GHz in FIG. 7) to enable ML operation on all the associated links 106, 108, 110.

Figure 8:
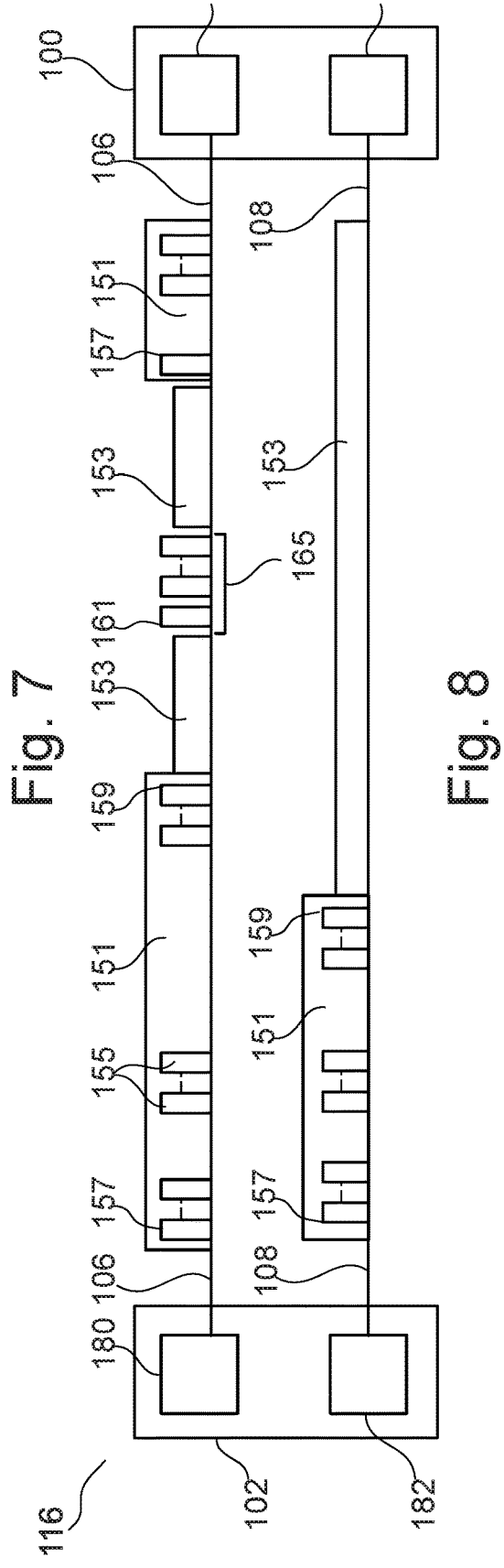
FIG. 8 illustrates a WiFi network comprising a multi-radio station, and a multi-radio access point being coupled for communicating over two communication links according to an exemplary embodiment.

FIG. 8 illustrates a WiFi network 116 comprising a multi-radio station 100, and a multi-radio access point 102 being coupled for communicating over two communication links 106, 108 according to an exemplary embodiment. The multi-radio station 100 may be configured for seamless roaming involving multi-radio access point 102, as described for previously mentioned embodiments.

FIG. 8 illustrates communication between a multi-radio station 100 and a multi-radio access point 102 over a first communication link 106 and a second communication link 108. FIG. 8 shows for each of the communication links 106, 108 an active mode 151 and a doze mode 153 and illustrates data frame exchanges 155. Reference sign 157 indicates a power management (PM) signal having a logical value PM=0, e.g. deactivating an energy saving mode in a respective communication link 106, 108. Correspondingly, reference sign 159 indicates a power management signal having a logical value PM=1, e.g. activating an energy saving mode in a respective communication link 106, 108. A poll signal 161 is shown as well in first communication link 106. Reference sign 165 indicates an awake state.

Exemplary embodiments may be implemented using the power management architecture according to FIG. 8 for providing a multi-link power save configuration. In particular, an MLD STA such as multi-radio station 100 can be configured to carry out power management on each of the communication links 106, 108, . . . independently.

Figure 9:
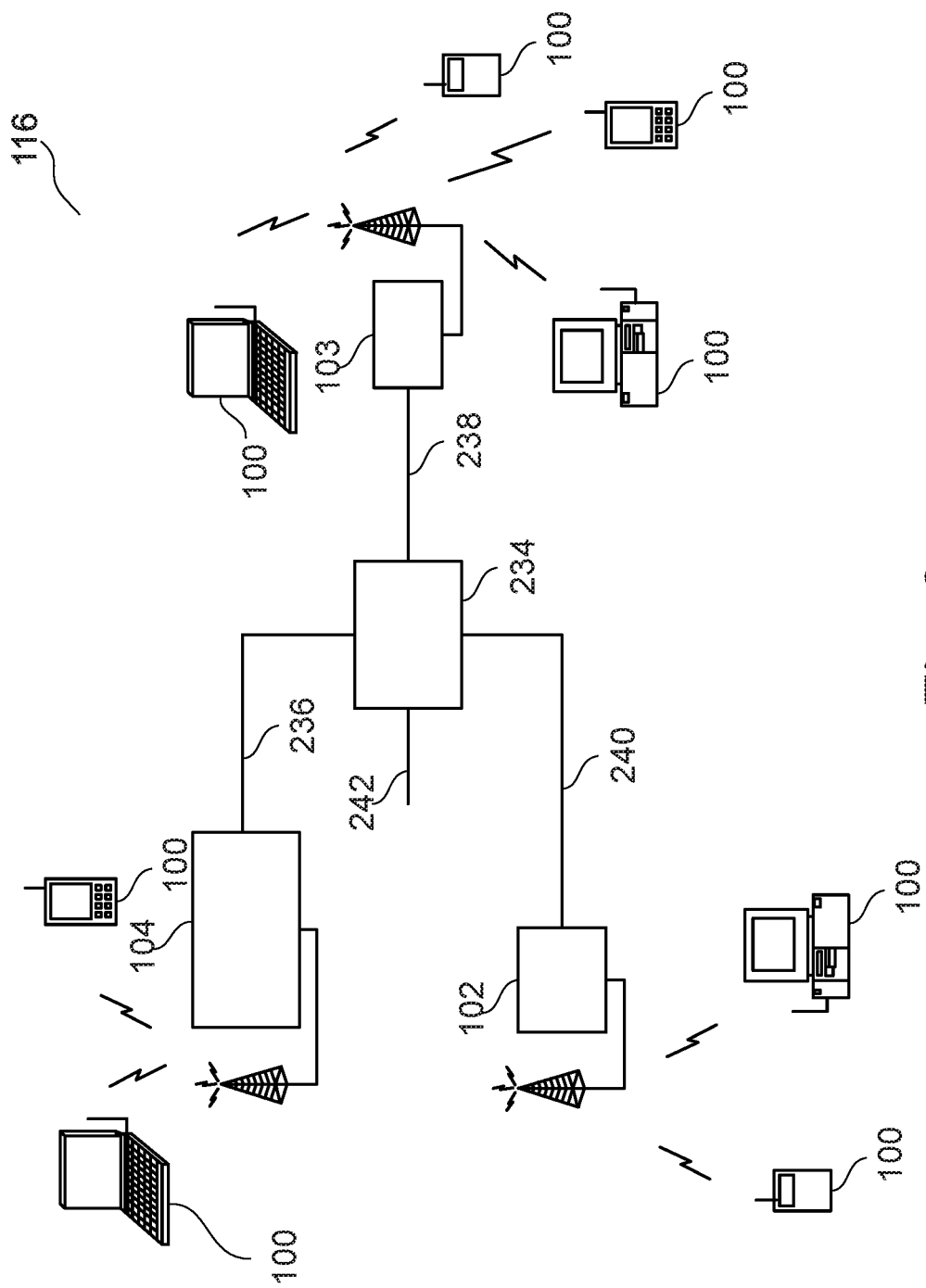
FIG. 9 is a diagram illustrating an embodiment of a wireless communication system in which some aspects of the subject technology can be implemented.

FIG. 9 is a diagram illustrating an embodiment of a wireless communication system, e.g. WiFi network 116, in which some aspects of the subject technology can be implemented. The WiFi network 116 includes access points 102, 103 104; wireless communication devices embodied as wireless stations 100 (STAs); and a network hardware component 234. The wireless stations 100 may be laptop computers, or tablets, personal digital assistants, personal computers, and/or cellular telephones. Other examples of such stations 100 can also or alternatively include other types of devices that contain wireless communication capability.

Some examples of stations 100 that may be implemented to operate in accordance with any of the various examples, embodiments, options, and/or their equivalents, etc., described herein may include, but are not limited to, appliances within homes and businesses, etc., such as refrigerators, microwaves, heaters, heating systems, air conditioners, air conditioning systems, lighting control systems, and/or any other types of appliances, etc.; meters such as for natural gas service, electrical service, water service, internet service, cable and/or satellite television service, and/or any other types of metering purposes, etc.; devices wearable on a user or person, including watches, monitors such as those that monitor activity level, bodily functions such as heartbeat, breathing, and bodily activity, bodily motion or lack thereof, etc.; medical devices including intravenous medicine delivery-monitoring and/or controlling devices, blood-monitoring devices (e.g., glucose-monitoring devices) and/or any other types of medical devices, etc.; premises-monitoring devices such as movement-detection/monitoring devices, door closed/ajar detection/monitoring devices, security/alarm system monitoring devices, and/or any other type of premises-monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented as station 100 to operate in accordance with any of the various examples, embodiments, options, and/or their equivalents, etc., described herein.

The access points (APs) 102, 103, 104 are operably coupled to the network hardware 234 via local area network (LAN) connections 236, 238, and 240. The network hardware 234, which may be a router, switch, bridge, modem, system controller, etc., provides a wide area network (WAN) connection 242 for the communication system of FIG. 9. Each of the access points 102, 103, 104 may have an associated antenna or antenna array to communicate with the wireless communication devices in its area. Typically, the wireless communication devices register with a particular access point 102, 103, 104 to receive services from the communication system. For direct connections (e.g., point-to-point communications), wireless communication devices communicate directly via an allocated channel. Any of the various wireless communication devices or stations 100 and APs 102, 103, 104 may include a processing circuitry and/or a communication interface to support communications with any other of the wireless communication devices or stations 100 and APs 102, 103, 104. In an example of operation, a processing circuitry and/or a communication interface implemented within one of the devices (e.g., any one of the stations 100 and APs 102, 103, 104) is configured to process at least one signal received from and/or to generate at least one signal to be transmitted to another one of the devices (e.g., any other one of the stations 100 and APs 102, 103, 104).

The processing circuitry and/or the communication interface of any one of the various stations 100 and APs 102, 103, 104, may be configured to support communications with any other of the various devices, stations 100 and APs 102, 103, 104. Such communications may be uni-directional or bi-directional between devices. Also, such communications may be uni-directional between devices at one time and bi-directional between those devices at another time.

In an example, a device (e.g., any one of the stations 100 and APs 102, 103, 104) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, and other operation(s) separately, independently from one another). In some examples, such a processing circuitry includes all capability, functionality, and/or circuitry, etc., to perform such operations as described herein. In some other examples, such a communication interface includes all capability, functionality, and/or circuitry, etc., to perform such operations as described herein. In even other examples, such a processing circuitry and a communication interface include all capability, functionality, and/or circuitry, etc., to perform such operations as described herein, at least in part, cooperatively with one another.

Implementations within the scope of the present disclosure can be partially or entirely realized using a tangible computer-readable storage medium (or multiple tangible computer-readable storage media of one or more types) encoding one or more instructions. The tangible computer-readable storage medium also can be nontransitory in nature.

The computer-readable storage medium can be any storage medium that can be read, written, or otherwise accessed by a general purpose or special-purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM and TTRAM. The computer-readable medium also can include any nonvolatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG and Millipede memory.

Further, the computer-readable storage medium can include any nonsemiconductor memory such as optical disk storage, magnetic disk storage, magnetic tape, other magnetic storage devices or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or nonexecutable machine code or as instructions in a high-level language that can be compiled to produce executable or nonexecutable machine code. Further, instructions also can be realized as or can include data. Computer-executable instructions also can be organized in any format, including routines, subroutines, programs, data structures, objects, modules, applications, applets and functions, etc. As recognized by those of skill in the art, details including, but not limited to, the number, structure, sequence, and organization of instructions can vary significantly without varying the underlying logic, function, processing and output.

It should be noted that certain passages of this disclosure may reference terms such as "first" and "second" in connection with devices, mode of operation, transmit chains, etc., for purposes of identifying or differentiating one from another or from others. These terms are not intended to merely relate entities (for instance, a first device and a second device) temporally or according to a sequence, although in some cases, these entities may include such a relationship. Nor do these terms limit the number of possible entities (for instance, devices) that may operate within a system or environment.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

Having now described some illustrative embodiments, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other embodiments or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments comprising the items listed thereafter exclusively. In one implementation, the systems and methods described herein consist of one, each combination of more than one, or all of the described elements, acts, or components.

Any references to embodiments or elements or acts of the systems and methods herein referred to in the singular can also embrace embodiments including a plurality of these elements, and any references in plural to any implementation or element or act herein can also embrace embodiments including only a single element. References in the singular or plural form are not intended to limit the presently disclosed systems or methods, their components, acts, or elements to single or plural configurations. References to any act or element being based on any information, act or element can include embodiments where the act or element is based at least in part on any information, act, or element.

Any implementation disclosed herein can be combined with any other implementation, and references to "an implementation," "some embodiments," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and embodiments disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. The foregoing embodiments are illustrative rather than limiting of the described systems and methods. The scope of the systems and methods described herein can thus be indicated by the appended claims, rather than the foregoing description, and changes that come within the meaning and range of equivalency of the claims are embraced therein.

We claim:

1. A method for seamless WiFi roaming, comprising:
   activating, by one of a multi-radio station or a target access point, a second communication link between the multi-radio station and the target access point to a higher power mode from a reduced power mode while a first communication link between the multi-radio station and an initial access point is still active, wherein activation of the second communication link comprises successful authentication and association via a physical layer medium and wherein the active first communication link has been successfully authenticated and associated; and
   responsive to said activating the second communication link to the higher power mode, deactivating, by one of the multi-radio station or the target access point, a reduced power mode of the first communication link between the multi-radio station and the initial access point, wherein both the first communication link and the second communication link are maintained active with successful authentication and association for at least an overlap time interval.

2. The method according to claim 1, wherein the multi-radio station is a multi-link station.

3. The method according to claim 1, further comprising transmitting, over the first communication link and over the second communication link, communication messages between the multi-radio station and at least one of the initial access point and the target access point.

4. The method according to claim 3, further comprising transmitting communication messages over the first communication link and over the second communication link using different communication frequency channels of a common communication frequency band, or different communication frequency bands.

5. The method according to claim 3, further comprising transmitting communication messages over the first communication link and over the second communication link simultaneously or by time multiplexing.

6. The method according to claim 1, wherein deactivating further comprises transmitting a power management command to put the first communication link into the reduced power mode.

7. The method according to claim 1, wherein the initial access point is a multi-radio access point and the target access point is a multi-radio access point.

8. The method according to claim 1, wherein the initial access point is a multi-radio access point and the target access point is a single-radio access point.

9. The method according to claim 1, wherein the initial access point is a single-radio access point and the target access point is a multi-radio access point.

10. The method according to claim 1, wherein the initial access point is a single-radio access point and the target access point is a single-radio access point.

11. The method according to claim 1, further comprising, before activating the second communication link between the multi-radio station and the target access point, deactivating the first communication link with the initial access point into the reduced power mode.

12. The method according to claim 1, wherein activating further comprises transmitting a power management command to put the second communication link into the higher power mode.

13. The method according to claim 1, wherein deactivating the first communication link between the multi-radio station and the initial access point comprises executing a de-authentication process between the multi-radio station and the initial access point.

14. The method according to claim 1, further comprising, after deactivating the first communication link between the multi-radio station and the initial access point to the reduced power mode, activating the first communication link between the multi-radio station and the target access point from the reduced power mode to the higher power mode.

15. The method according to claim 1, further comprising transmitting communication messages over the first communication link, over the second communication link, and over at least one further communication link between the multi-radio station on the one hand and at least one of the initial access point and the target access point on the other hand.

16. A multi-radio station comprising:
a communication interface; and
processing circuitry coupled to the communication interface and configured for:
    activating a second communication link via a physical layer medium between the multi-radio station and a target access point to be authenticated, associated and in a higher power mode from a reduced power mode while a first communication link between the multi-radio station and an initial access point is still active wherein the active first communication link has been successfully authenticated and associated; and
    responsive to said activating the second communication link to the higher power mode, deactivating the reduced power mode of the first communication link between the multi-radio station and the initial access point to be de-authenticated and de-associated, wherein both the first communication link and the second communication link are maintained active and authenticated and associated for at least an overlap time interval.

17. The multi-radio station according to claim 16, configured as one of a group comprising a mobile device, a smart phone, a laptop, a personal digital assistant, a tablet, a television device, and a desktop computer.

18. A WiFi chip for a multi-radio station configured for:
activating a second communication link via a physical layer medium between the multi-radio station and a target access point to be authenticated, associated and in a higher power mode from a reduced power mode while a first communication link between the multi-radio station and an initial access point is still active; and
responsive to said activating the second communication link to the higher power mode, deactivating the reduced power mode of the first communication link between the multi-radio station and the initial access point to be de-authenticated and de-associated, wherein both the first communication link and the second communication link are maintained authenticated and associated for at least an overlap time interval.

19. A WiFi network, comprising:
a multi-radio station communicatively coupled with an initial access point, and to be communicatively coupled with a target access point; and
wherein the multi-radio station is configured for:
    activating a second communication link via a physical layer medium between the multi-radio station and the target access point to be authenticated, associated and in a higher power mode from a reduced power mode while a first communication link between the multi-radio station and the initial access point is still active, wherein the active first communication link has been authenticated and associated via the physical layer medium; and
    responsive to said activating the second communication link to the higher power mode, deactivating the reduced power mode of the first communication link between the multi-radio station and the initial access point, wherein both the first communication link and the second communication link are maintained active via a physical layer medium for at least an overlap time interval.

20. One or more non-transitory storage media storing computer-useable instructions that, when used by one or more processing circuitries, cause the one or more processing circuitries to:
activate a second communication link between a multi-radio station and a target access point to be authenticated, associated and in a higher power mode from a reduced power mode while a first communication link between the multi-radio station and a initial access point is still authenticated and associated; and
responsive to said activating the second communication link to the higher power mode deactivate a reduced power mode of the first communication link between the multi-radio station and the initial access point, wherein both the first communication link and the second communication link are maintained active and enabled via a physical layer medium to do an active data frame exchange for at least an overlap time interval.

* * * * *